United States Patent [19]

Horwood et al.

[11] Patent Number: 5,762,021

[45] Date of Patent: Jun. 9, 1998

[54] FEEDER FOR BREEDER POULTRY

[75] Inventors: Francis Hedley Horwood, Oatlands; Gerry Bigeni, Wentworthville, both of Australia

[73] Assignee: F & M Horwood Nominees Pty. Ltd., Auburn, Australia

[21] Appl. No.: 589,378

[22] Filed: Jan. 22, 1996

[30] Foreign Application Priority Data

Jan. 23, 1995 [AU] Australia ................................. PN0698

[51] Int. Cl.$^6$ ................................................. A01K 5/02
[52] U.S. Cl. ........................ 119/57.4; 119/57.7; 119/52.1
[58] Field of Search .................................. 119/57.4, 57.7, 119/51.01, 57.92, 52.1, 56.1, 57.5

[56] References Cited

U.S. PATENT DOCUMENTS

| | | | |
|---|---|---|---|
| 5,007,380 | 4/1991 | Badia et al. | 119/57.4 |
| 5,092,274 | 3/1992 | Cole et al. | 119/57.4 |
| 5,097,797 | 3/1992 | Van Zee et al. | 119/57.4 |
| 5,113,797 | 5/1992 | Van Daele | 119/57.4 |
| 5,311,839 | 5/1994 | Pollock et al. | 119/57.4 |

*Primary Examiner*—John S. Hilten
*Attorney, Agent, or Firm*—Ladas & Parry

[57] ABSTRACT

The present invention provides a poultry feeding apparatus (30) for receiving poultry feed from an auger pipe (60). The apparatus (30) comprises a feeder tube (35) and an interengagement member. The feeder tube (35) extends between the auger pipe (60) and a feeding pan. The interengagement member is adapted for interengaging the auger pipe (60) with the poultry feeding apparatus (30) to prevent rotational swinging of the apparatus (30) relative to the auger pipe (60). The interengagement member may comprise fastening means (53) for receiving at least one projection (63) formed in the auger pipe (60), or the auger pipe (60) may comprise fastening means for receiving at least one projection formed in the interengagement member. The fastening means is preferably a notch formed therein. The feeder tube (35) preferably comprises upper and lower receiving members (31,35A). In the preferred embodiment, the interengagement member comprises an insert member (50) that is substantially complementarily shaped to a portion of the auger pipe (60) and that has a feed aperture (51) formed therein with at least one notch (53,54) formed in the aperture (51).

24 Claims, 7 Drawing Sheets

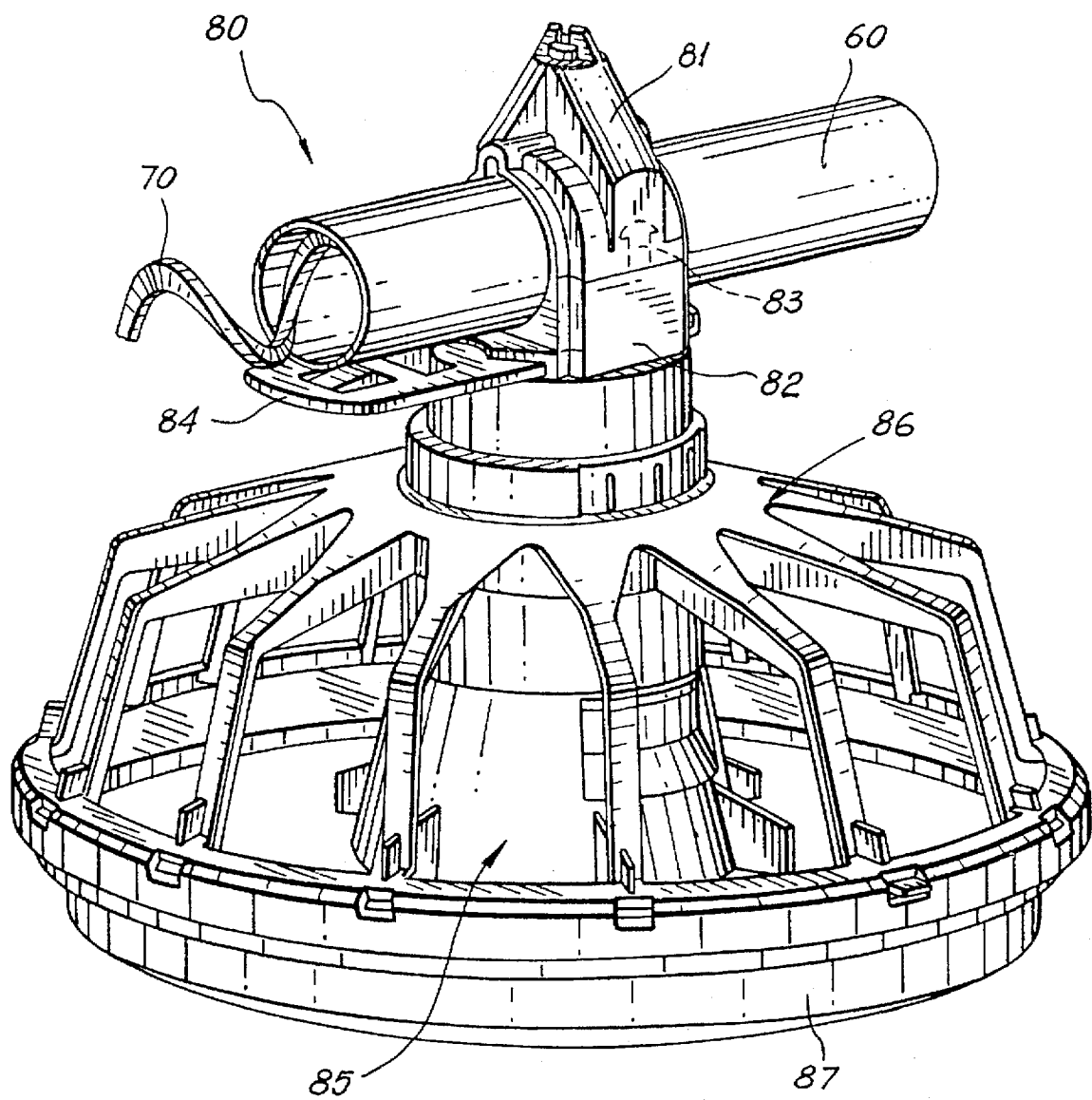
F I G. 7

FEEDER FOR BREEDER POULTRY

FIELD OF THE INVENTION

The present invention is directed towards the field of poultry feeders for dispensing food to poultry livestock. In particular, it is directed towards poultry feeders that provide food to breeder poultry.

BACKGROUND OF THE INVENTION

In the prior art, conventional poultry feeders have been used to dispense food to male and female poultry livestock. In particular, such a poultry feeder has been used to feed both "broiler" chickens and breeder (parent/grandparent) chickens, as described below.

A conventional poultry feeder 1 used for feeding breeder and broiler chicken shown in FIG. 1 includes a receiver 7, a feeder tube 11, a cage 9, and a feeder pan 8. An auger pipe 5 is coupled to the receiver 7 having an aperture 10 (a similar aperture is located in the opposite side). An auger 6 is rotatably disposed within the pipe 5 to transport the poultry feed. The receiver 7 and the feeder tube 11 comprise a single unit.

The receiver 7 has a shut-off valve with a shutter 2 incorporating an opening 3. The shutter 2 passes through an aperture 4 (another aperture is similarly located on the opposite side of the receiver 7). The shut-off valve is used to connect and disconnect the flow of poultry feed from the pipe 5 to the poultry feeder 17 thereby controlling the dispensing of the poultry feed.

The cage 9 consists of a plurality of cage arms 9A–9G and has a gap 9H. The receiver 7 and the feeder tube 11 concentrically are disposed within the cage 9. The cage arms 9A–9G extend to a cage rim, which in turn can be coupled to the feeder pan 8.

A feed opening in the pipe 5 (not shown) is located within the receiver 7 to provide poultry feed to the poultry feeder 1. The gaps formed by the cage arms 9A–9G allow the poultry to consume the poultry feed contained in the feeder pan 8.

The poultry feeder 1 is placed on the auger pipe 5 at one end and slid into position along the pipe 5. This is repeated for a plural number of such feeders connected to the auger pipe. Consequently, it is time consuming and difficult to assemble, maintain or remove a poultry feeder 1 from the pipe 5, because the auger pipe 5 passes through the apertures in the single-piece receiver 7 of each feeder 1.

A double headed arrow shown in FIG. 1 indicates that the conventional poultry feeder 1 can be rotationally rocked or swung about the longitudinal axis of the pipe 5. Such swinging is permitted to ensure that "broiler" chicken are not bruised by banging against the poultry feeder 1. Bruising of broiler poultry livestock adversely affects the quality, and hence the value, of the poultry.

Such conventional poultry feeders 1 are also used to feed parent and grandparent poultry stock that supply eggs from which the "broilers", and from which the "parent" stock are hatched, respectively. Neither the parent nor the grandparent stock are produced specifically for eating, although ultimately this may occur, and therefore bruising is not a significant consideration in this connection.

The best performance of the parent and grandparent stock in producing hatchable eggs is dependent on the body weight of the poultry. Variation in the programmed amount of poultry feed consumed by each bird affects the quality of the resulting eggs the number of progeny, the hatchability of the eggs, and the growing capacity of the resulting broilers produced by the parent and grandparent stock. In this connection, the parent stock are more critically affected. It is important to control the body weight of the birds to ensure high levels of hatchability. Thus, the poultry are given predetermined rations of poultry feed, and are fed according to strict feeding charts and programs to obtain the best performance of the parent and grandparent stock dependent on the weight of the birds.

The conventional poultry feeder 1 is disadvantageous for use when feeding parent and grandparent stock because the larger birds, frequently bang, nudge, or otherwise swing the poultry feeder 1 about the pipe 5 to dislodge additional feed and thereby provide more than the programmed amount of poultry feed intended to be delivered to a particular poultry feeder 1. Similarly, this disadvantageously results in reduced amounts of poultry feed being delivered to other poultry feeders in the poultry feeding system.

In attempts to prevent such swinging, a conventional feeder 12 shown in FIG. 2 uses a clamping arrangement to reduce rotation about an auger pipe 16 and to maintain the feeder 12 at a location along the pipe 16.

The partial view of this conventional poultry feeder 12 in FIG. 2 shows a receiver 18 and a feeder tube 22. As indicated by ellipsis, the cage and the feeder pan of the feeder poultry are not shown and only a portion of the feeder tube 22 is shown to simplify the drawing.

The auger pipe 16 for providing poultry feed is coupled to the poultry feeder 12 through an aperture 21 (the oppositely positioned aperture not being shown) the receiver 18 from which the feeder tube 22 depends. An auger 17 is rotatably disposed within the pipe 16 for transporting the poultry feed through the pipe 16. The pipe 16 has a feed opening (not shown) located within the receiver 18. The receiver 18 includes a shut-off valve (not shown in FIG. 2 but having a similar construction and position as that shown in FIG. 1) for controlling the flow of poultry feed from the auger pipe 16 to the feeder pan.

A split tube 23 integrally formed on the receiver 18 is used in the conventional feeder 12 to increase tension between the pipe 16 and the receiver 18 in an attempt to prevent swinging of the feeder 12 by the poultry. The split tube 23 has a longitudinal slit so that the tube 23 can be placed onto the pipe 16, as described above. Clamps 24 and 25 are oppositely disposed on either side of the receiver 18 to connect the split tube 23 to the pipe 16 by tightening and securing the respective ring bands in an attempt to prevent swinging of the poultry feeder 12. Nonetheless, large birds are able to continue to bang the pan and rotate the feeder 12 so that feed is unevenly distributed. Further, with time, such banging increases the play between the clamping arrangement and the auger pipe 16 so that the feeder 12 loosely swings about the pipe 16. This necessitates readjustment and maintenance of the clamps. In addition, this arrangement makes it difficult and time consuming to remove any one feeder 12 from the pipe 16 as intervening feeders between it and the end of the pipe must be removed first. Still further, the clamping arrangement is unhygienic as birds roosting on the auger pipe 16 will foul the clamps 24 and 25 with droppings that tend to adhere to the clamps and ring bands. This also makes it more difficult to adjust or remove the clamps and ring bands.

SUMMARY OF THE INVENTION

In a first aspect of the invention, there is provided a poultry feeding apparatus for receiving poultry feed from an auger pipe, the apparatus comprising:

a feeder tube extending between the auger pipe and a feeding pan; and interengagement means adapted for interengaging the auger pipe with the poultry feeding apparatus to prevent rotational swinging of the apparatus relative to the auger pipe.

Preferably, the interengagement means comprises fastening means for receiving at least one projection formed in the auger pipe. Alternatively, the auger pipe comprises fastening means for receiving at least one projection formed in the interengagement means. The fastening means is preferably a notch formed therein.

Preferably, the feeder tube comprises upper and lower receiving members, and a pair of grooves formed in the upper receiving member and a corresponding pair of ribs formed in the lower receiving member. Alternatively, the feeder tube comprises upper and lower receiving members, hinge means for connecting the upper and lower receiving members on one side, and means for releasably clamping the upper and lower receiver members together around the auger pipe on the other side. Optionally, the feeder tube comprises upper and lower receiving members and a part cylindrical tube within which the auger pipe is snap engaged.

Preferably, the interengagement comprises an insert member being substantially complementarily shaped to a portion of the auger pipe. The insert has a feed aperture formed therein with at least one notch formed in the aperture.

In a first aspect of the invention, there is provided a poultry feeding arrangement comprising: an auger pipe and a number of poultry feeding apparatuses as set forth above.

BRIEF DESCRIPTION OF THE DRAWINGS

Three embodiments of the invention will now be described with reference to the drawings, in which:

FIG. 7 is a perspective view of a poultry feeder according to a second embodiment.

DETAILED DESCRIPTION

FIGS. 3 to 6 illustrate a poultry feeder 30 according the first, preferred embodiment of the invention. The poultry feeder 30 includes a two part receiver: an upper receiver section 31 and a lower receiver section 35A preferably integrally formed with the upper portion of feeder tube 35. The poultry feeder 30 preferably includes a pipe engaging insert 50 that is positioned in the lower receiver section 35A, as described in detail below.

Figure 4:
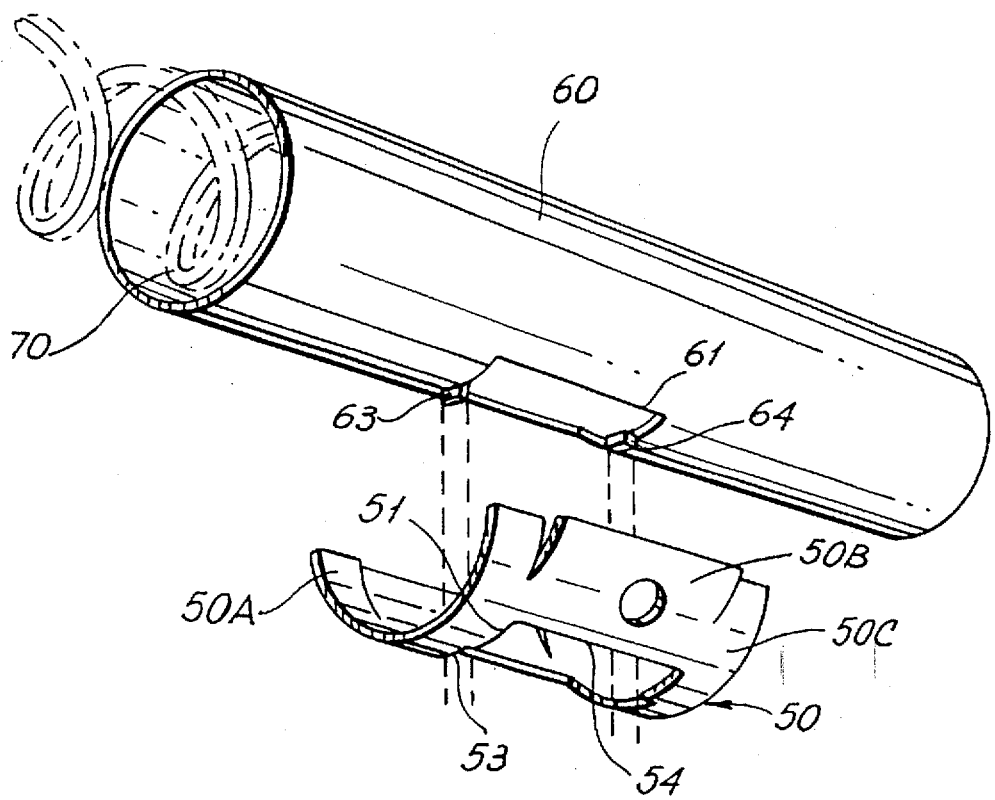

The two part assembly of the poultry feeder 30 advantageously enables the poultry feeder 30 to be assembled at each poultry feeder location along auger pipe 60, without each poultry feeder having to be slid onto the auger pipe 60 at one location and then moved along the auger pipe 60 to the respective poultry feeder location. In this connection, it will be understood that FIG. 4 provides only a partial view of auger pipe 60, and that auger pipe 60 has a plurality of apertures at positions along the auger pipe that are not shown to simplify the drawing.

The profile of the upper receiver section 31 and the lower receiver section 35A are substantially rectangular or square shaped when observed from the top plan view. The lower portion 42 of feeder tube 35 is substantially circular in cross section from the top plan view. Further, the lower portion 42 of the feeder tube 35 preferably has a pair of oppositely positioned apertures 43 formed in the sides of the feeder tube 35.

The feeder tube 35 also preferably has an in-line, shut-off valve 44 incorporated in the feeder tube 35 between the lower receiver section 35A and the lower portion 42 of the feeder tube 35.

The upper receiver section 31 has a pair of grooves 32A and 32B located on, and co-extensive with, opposing sides of the receiver 31. The grooves 32A and 32B are used for engaging the upper receiver section 31 with the lower receiver 35A. The cross-sectional profile of grooves 32A and 32B preferably defines a substantially tee-shaped cavity, which opens in its smallest dimension outwardly from the respective side. The remaining two opposing sides of the upper receiver 31 each have a semi-circular, cut-out formed therein that opens downwardly. While FIG. 3 only illustrates one semi-circular, cut-out 33 in upper receiver 31, it will be apparent to a person skilled in the art that a corresponding cut-out, while not illustrated, is formed in the opposite, rearward side.

Figure 1:
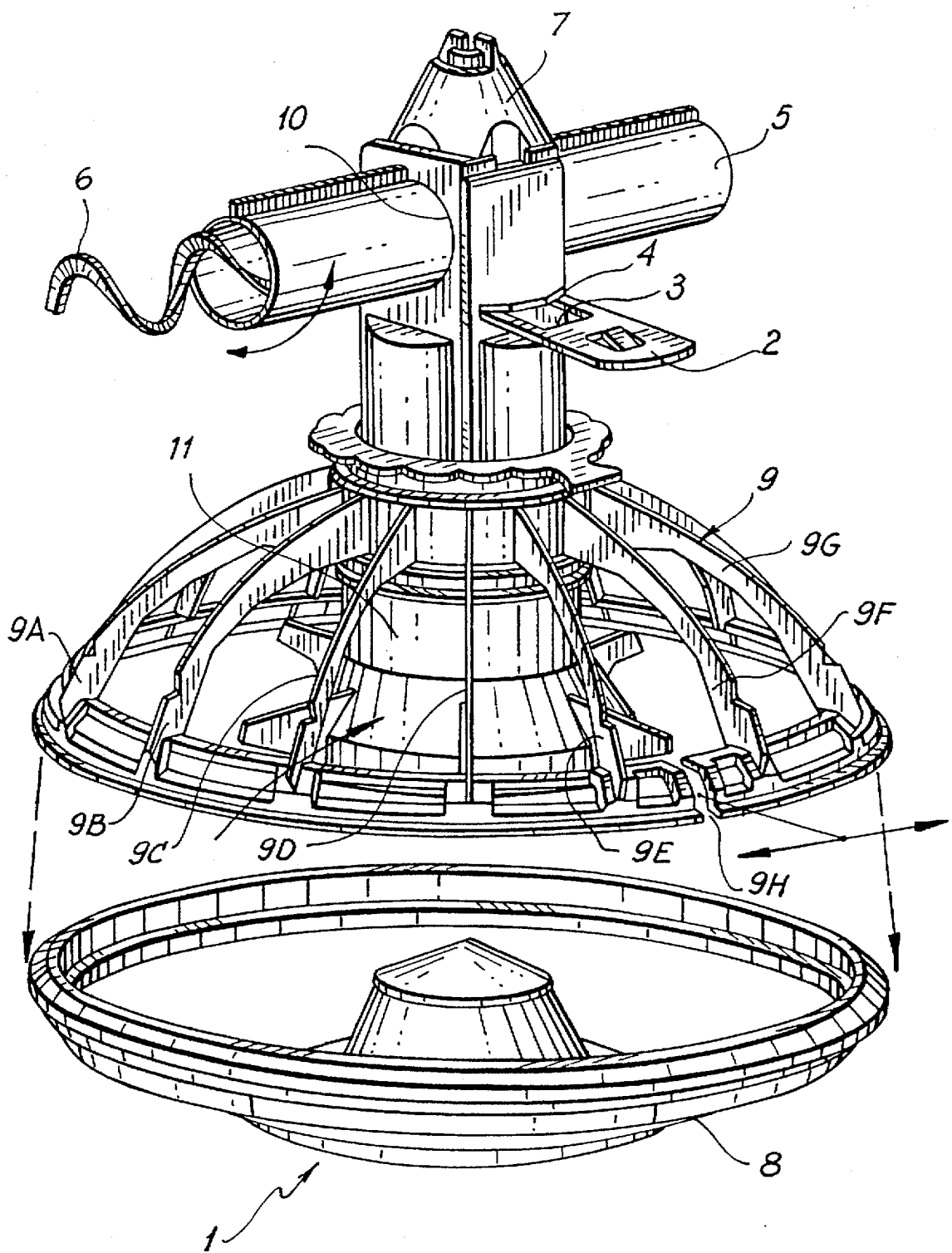
FIG. 1 is a perspective view illustrating a first conventional poultry feeder.
Figure 2:
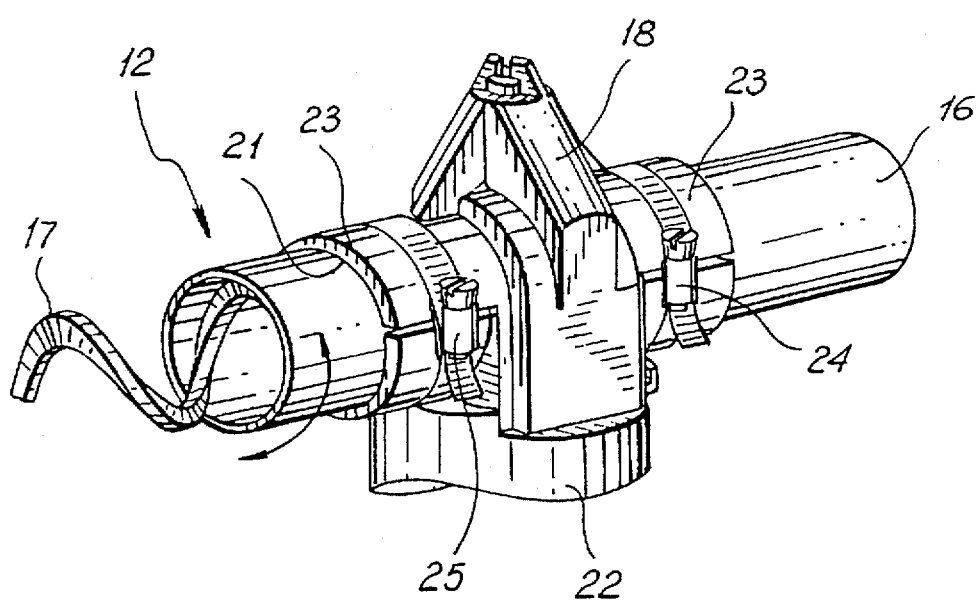
FIG. 2 is a perspective view illustrating a second conventional poultry feeder.
Figure 3:
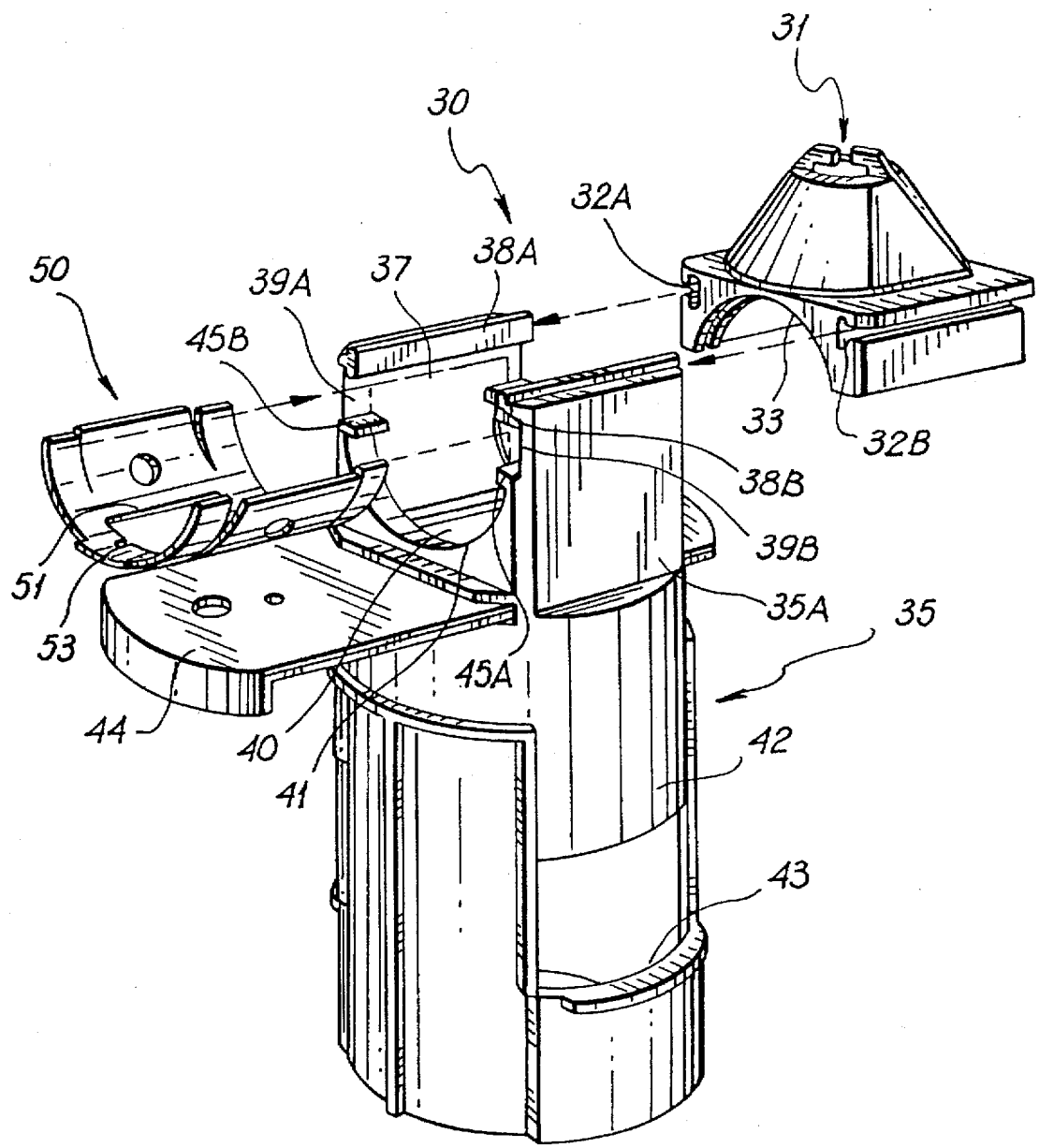
FIGS. 3 to 6 are views of a poultry feeder connected to an auger pipe according to a first, preferred embodiment of the invention.

A first set of dashed arrows in FIG. 3 indicates that grooves 32A and 32B are slidingly engageable with respective ribs 38A and 38B within the lower receiver section 35A. The opposing rib members 38A and 38B have a complementary, tee-shaped profile that corresponds to the cavities of the grooves 32A and 32B. The ribs 38A and 38B project inwardly from, and are substantially normal to, the interior surfaces of the opposing sides of lower receiver section 35A.

Grooves 39A and 39B formed beneath ribs 38A and 38B are shaped to receive the lower portions of the upper receiver section 31, which contacts the upper surfaces of four inwardly projecting flanges (45A to 45D; the rearward pair 45C and 45D are not illustrated) of the lower receiver section 35A. The four inwardly projecting flanges (45A to 45D) are positioned in pairs on the interior sides of the lower receiver section 35A.

As shown in FIG. 3, each pair of the flanges 45A, 45B and 45C, 45D defines the upper extent of a semi-circular cut-out 41 formed in the remaining sides of the lower receiver section 35A. It will be apparent to a person skilled in the art that the grooves and the ribs may be practiced using different shapes and configurations without departing from the scope and spirit of the present invention.

The upper receiver section 31 and the feeder tube 35 are preferably formed of plastics, although other materials may be used to fabricate those components.

Figure 5:
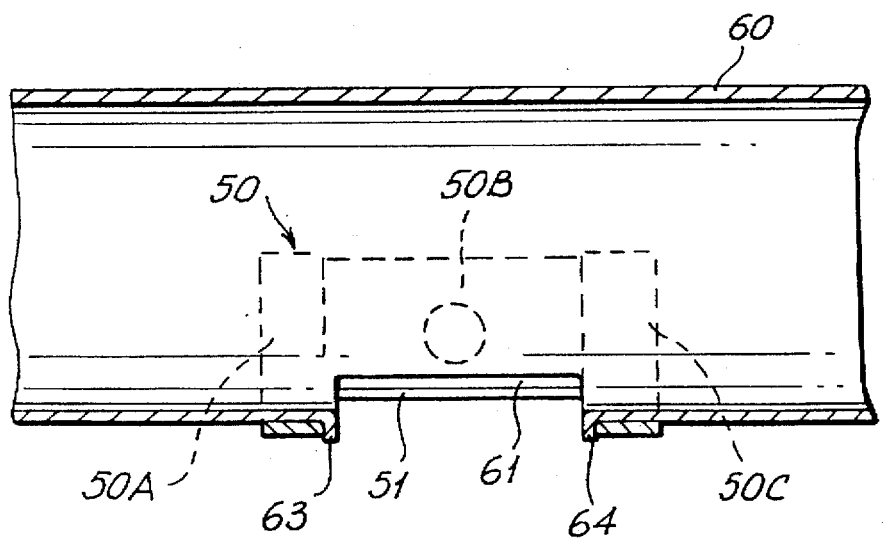

Interengagement between the poultry feeder 30 and the auger pipe 60 is provided by means of notches and lugs according to the preferred embodiment. Interengagement is preferably carried out using an insert member 50 made of sheet metal that is punched, cut and rolled to have a substantially semi-circular cross-section and part cylindrical form. As indicated in FIGS. 3, 4 and 5, the insert 50 has a poultry feed passage or aperture 51 centrally formed therein with a pair of cut-out notches 53 and 54 preferably formed on opposite sides of the aperture 51 in line with the longitudinal axis of the insert 50.

The insert member 50 has four cuts or slits formed radially in two of its sides, thereby defining forward and rearward sections 50A and 50C, having a first matching radius, and an intermediate section 50B having a larger radius than that of sections 50A and 50C. The cuts or slits form four curved arm members or tongues in the forward and rearward sections 50A and 50C. The arm members are provided for snapping engagement with the cut-out sections 41 and the corresponding pairs of flanges 45A to 45D of the feeder tube 35.

A second set of dashed arrows in FIG. 3 shows that the insert 50 may be introduced into the lower receiver section 35A via the interior grooves 39A and then pressed downwardly. Thus, the four inwardly projecting flanges 45A to 45D engage the tongues of the forward and rearward sections 50A and 50C to rigidly hold the insert 50 within the lower receiving section 35A. The intermediate section 50B of the insert 50, which has a larger radius than that of the forward and rearward sections 50A and 50C, snugly engages the inner surfaces of the cut-out section 41 and the corresponding rearward cut-out section (not shown in FIG. 3).

Figure 6:
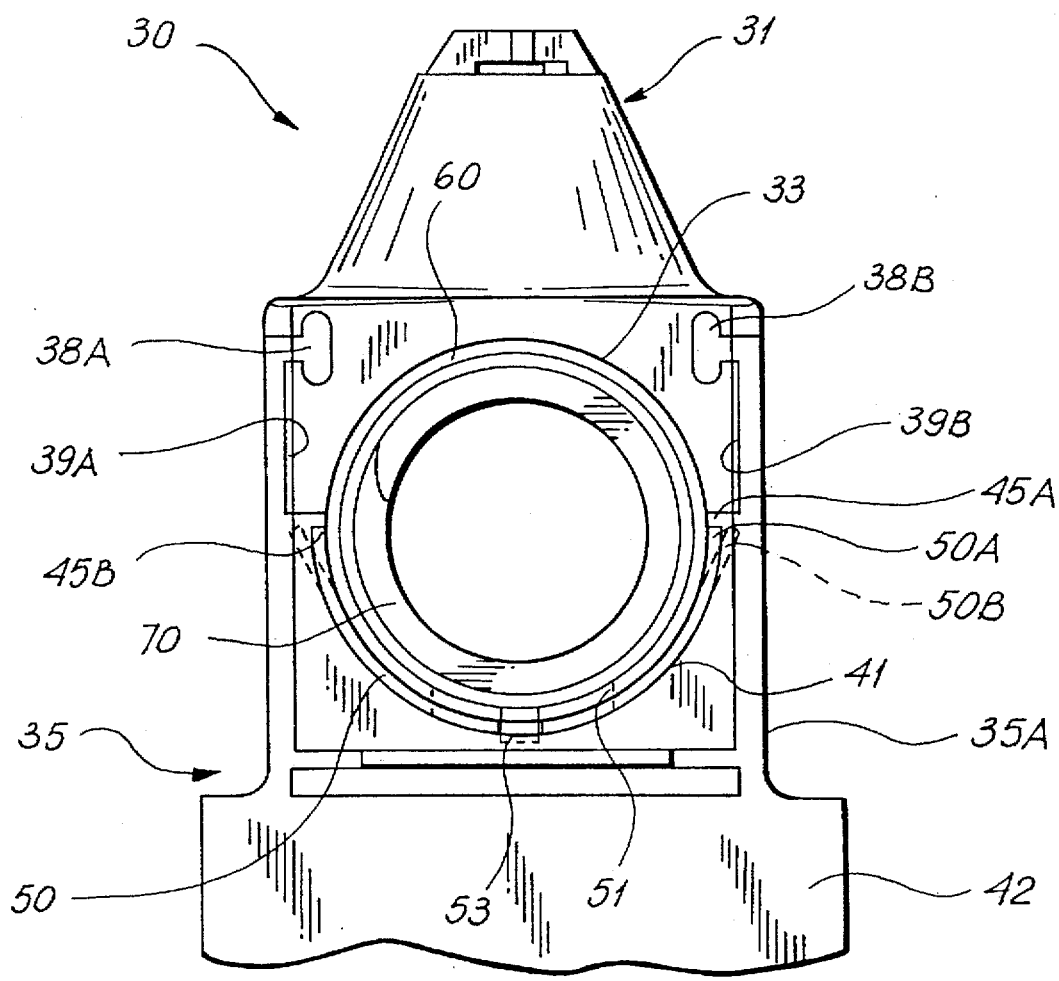

The assembled poultry feeder 30 of FIG. 6 shows that the forward section 50A engages the pair of flanges 45A and 45B adjacent to aperture 41. The intermediate section 50B is shown in phantom using dashed lines in the drawing. Once the insert 50 is securely positioned in the lower receiver section 35A, the poultry feeder 30 may then be attached to the auger pipe 60. While the preferred embodiment is described with reference to the pipe-engaging insert 50, it will be apparent to a person skilled in the art the member for interengaging the auger pipe and the feeder may be integrally formed in the feeder.

The preferred embodiment will now be described with reference to FIGS. 4 and 5, which illustrate how the insert 50 interengages with the auger pipe 60, and thereby securely connects the poultry feeder 30 to the auger pipe 60. For purposes of illustration only, the portion of auger pipe 60 shown in FIG. 4 only includes a single aperture 61. Preferably, the aperture 61 is substantially rectangularly shaped, although other shapes may be practiced without departing from the scope and spirit of the invention, and is located in the lower portion of the auger pipe 60. A pair of radially outwardly projecting lugs 63 and 64 are formed, preferably as a bent lip, in the opposite longitudinal ends of the aperture 61. It will also be apparent to a person skilled in the art that, while the insert 50 shown in the drawings incorporates a pair of circular apertures, the insert 50 may be fabricated without such circular apertures As shown in FIG. 4, the insert 50 interengages with the auger pipe 60 so that the aperture 51 of the insert 50 is substantially in alignment with the aperture 61 of the auger pipe 60. Dashed lines in FIG. 4 indicate that the radially outwardly projecting lugs 63 and 64 of the auger pipe 60 align with and engage the corresponding notches 53 and 54 formed in the aperture 51. In FIG. 5, a sectional, cut away view of auger pipe 60 and insert 50 (generally indicated in phantom using dashed lines) illustrates the engagement of projecting lugs 63 and 64 within corresponding notches 53 and 54 of insert 50. In an alternate embodiment, like notches may be formed in the aperture 61 and lugs may be formed in the insert 50 that project upwardly. It will be apparent to a person skilled in the art that other variations of this arrangement may be practiced without departing from the scope and spirit of the present invention.

Thus, the poultry feeder 30 can be securely connected to the auger pipe 60 by means of the projecting lugs 63 and 64 of the auger pipe, the engaging insert 50, and the two piece receiver assembly 31 and 35 of the poultry feeder 30.

Preferably, the metal insert 50 is snappingly engaged within the lower section of the feeder tube 35, although other techniques of fastening may be used without departing from the invention. The lower section of the feeder tube 35 is then brought into interengagement with the lower surface of auger pipe 60 so that the projecting lugs 63 and 64 of aperture 61 are firmly engaged with the corresponding notches 53 and 54 of insert 50. The upper receiver section 31 is then positioned on top of the auger pipe 60 so that the semi-circular, cut-out section 33 contacts the surface of the auger pipe 60. The upper receiver section 31 is slidingly engaged with the lower receiver section 35A so that the opposite grooves 32A and 32B are engaged with the corresponding ribs 38A and 38B, which are complementarily formed to the shape of the grooves 32A and 32B.

A front, elevational view of the assembled poultry feeder 30 is shown in FIG. 6. The assembled upper receiver section 31 and lower receiver section 35A firmly connects the poultry feeder 30 around the auger pipe 60. The interengagement between the radially projecting lugs 63 and 64 and the corresponding matching notches 53 and 54, thereby securely connects the poultry feeder 30 to the auger pipe 60. Thus, the internal aperture 40 of the feeder tube 35 is connected with the aperture 61 of the auger pipe 60 via the aperture 51 for the delivery of poultry feed. Further, the engagement between the lugs 63 and 64 and the notches 53 and 54 advantageously prevents rotation by the birds of the poultry feeder 30 about the auger pipe 60 regardless of the size of the bird. In this manner, the feeder 30 is able to prevent uneven distribution of poultry feed along the auger pipe 60 due to swinging or banging of the feeder 30. In addition, the preferred embodiment of the present invention does not require expensive and timely maintenance and readjustment of the poultry feeder in relation to the auger pipe.

A poultry feeder 80 according to a second embodiment of the invention shown in FIG. 7 includes a two part receiver having two sections 81 and 82. In the drawing, like components or features described with reference to FIGS. 3 to 6 have the same reference numerals. The lower receiver section 82 is integrally formed with the feeder tube 85. A shut-off valve 84 is included in the feeder 80 between the lower receiver section 82 and the feeder tube 85.

A cage 86 having a plurality of downwardly curved arms connected to a circular rim connects the feeder tube 85 and the feeder pan 87 together. The cage 86 and pan 84 were not illustrated in FIGS. 3 to 6 to more clearly set forth the preferred embodiment. While not shown in FIGS. 7 or 8, the poultry feeders 80 and 90 both preferably include an insert 50 and interior flanges formed in the lower receiver sections 82 and 92 to hold the insert 50 in place. These features have not been shown to more clearly set forth the technique of coupling the upper receiver sections 81, 91 and lower receiver sections 82, 92 according to the second and third embodiments.

The upper receiver section 81 can be coupled on its opposite side (not shown) to the lower receiver section 87 using any conventional connecting device such as a hinge, a slot and matching groove, etc. Alternatively, the upper and lower receiver sections 81 and 82 may comprise an integral structure connected by a thin flexible film on the rear side. This enables the upper receiving section 81 to be bent or flexed so that the forward side separates between the upper and lower receiver sections 81 and 82. The feeder may then be connected around the auger pipe 60. A securing device 83 (indicated in phantom using dashed lines) is used to releasably fasten the openable sides of the upper receiver section 81 and the lower receiver section 82 together. The device 83, such as a mushroom clamp, provides sufficient tension to clamp the poultry feeder 80 to the pipe 60 and thereby further assist in preventing swinging of the poultry feeder 80. Thus, large birds are prevented from swinging the poultry feeder 80, and thereby are prevented from adversely affecting the distribution of poultry feed, as described above.

Figure 8:
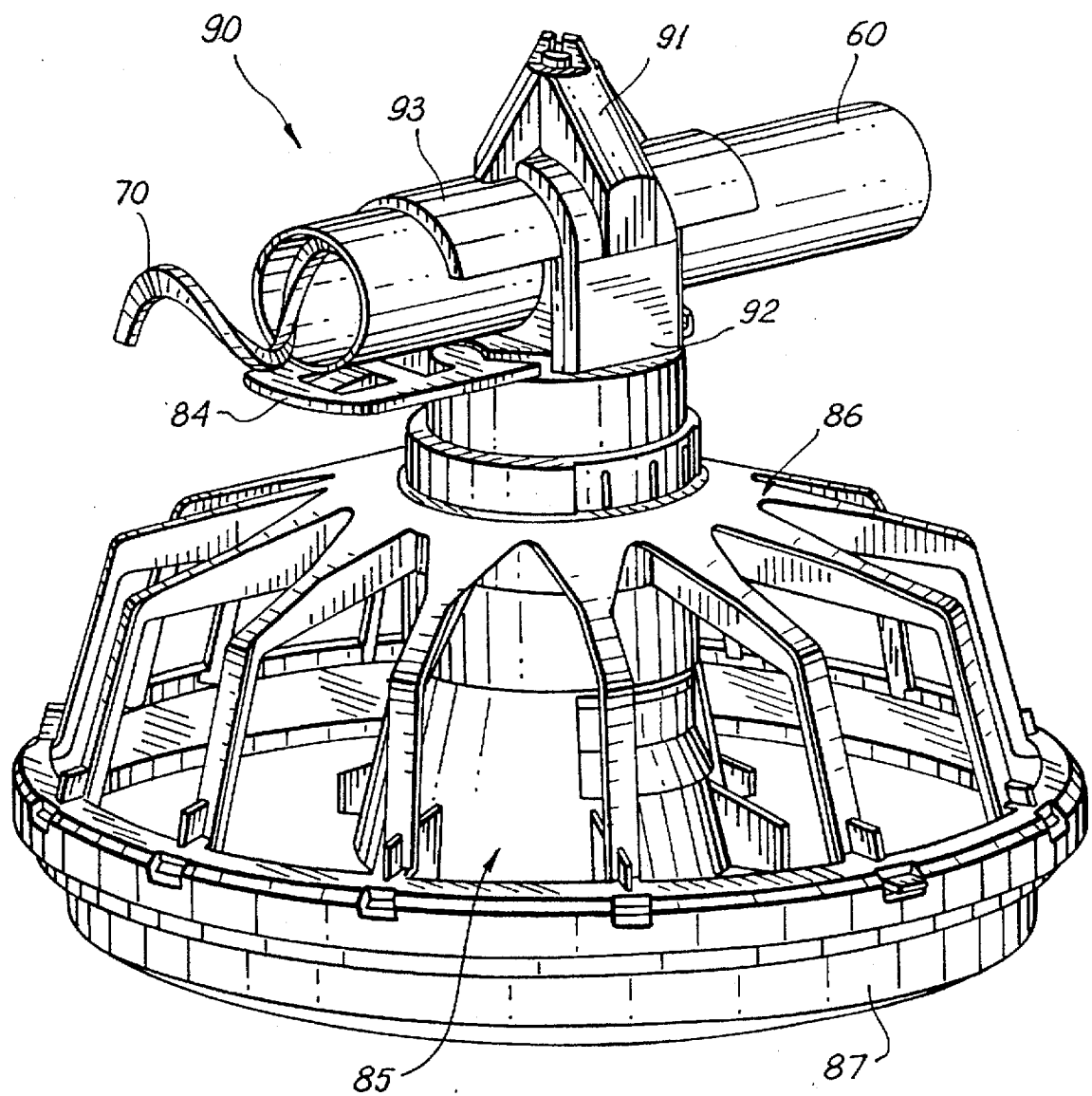
FIG. 8 is a perspective view illustrating a poultry feeder according to a third embodiment.

A poultry feeder 90 according to yet another embodiment shown in FIG. 8 includes upper and lower receiver sections 91 and 92. The upper section 91 has an integrally formed part cylindrical tube 93, which can be snap engaged with the pipe 60. This snap engagement together with the interconnection of the upper and lower receiver sections 91 and 92 provides sufficient clamping strength for grasping the pipe. The upper receiver section 91 can be secured to the lower receiver section 92 by, for example, using a pair of screw fasteners (not illustrated). The arrangement reduces the free play between the pipe 60 and the receiver sections 91 and 92, thereby securing the poultry feeder 90 to the pipe 60 and preventing swinging therebetween.

The foregoing describes only some specific embodiments of the present invention and modifications, obvious to those skilled in the art, can be made thereto without departing from the spirit and scope of the invention.

We claim:

1. A poultry feeding apparatus for receiving poultry feed from an auger pipe, said apparatus comprising:
   a feeding pan;
   a feeder tube having one end connectable with said auger pipe and being connected with said feeding pan;
   at least one projection formed at a feed aperture of said auger pipe;
   interengagement means adapted for interengaging said auger pipe with said poultry feeding apparatus to prevent rotational swinging of said apparatus relative to said auger pipe, wherein said interengagement means is located within said feeder tube at the end connectable with said auger pipe and has a feed aperture with at least one notch formed therein for interengaging said at least one projection, with said feed apertures of said auger pipe and said interengagement means being substantially in alignment.

2. The poultry feeding apparatus according to claim 1, wherein said interengagement means is substantially complementarily shaped to a portion of said auger pipe incorporating said feed aperture.

3. The poultry feeding apparatus according to claim 1, wherein said at least one projection formed in said auger pipe is a lug formed on the edge of said feed aperture of said auger pipe.

4. The poultry feeding apparatus according to claim 1, wherein said interengagement means is integrally formed in laid one end of said feeder tube connectable with said auger pipe.

5. The poultry feeding apparatus according to claim 1, wherein said interengagement means is an insert member engaged with said one end of said feeder tube connectable with said auger pipe.

6. The poultry feeding apparatus according to claim 5, wherein said insert member is made of metal and has a part cylindrical form.

7. The poultry feeding apparatus according to claim 6, wherein said one end of said feeder tube connectable with said auger pipe is adapted to snappingly engage said insert member therein.

8. The poultry feeding apparatus according to claim 5, wherein said insert member comprises two notches at opposite ends of said feed aperture of said insert member and said auger pipe comprises two projections formed at opposite ends of said feed aperture of said auger pipe for interengagement with a respective one of said two notches.

9. A poultry feeding apparatus for receiving poultry feed from an auger pipe, said apparatus comprising:
   a feeding pan;
   a feeder tube having one end connectable with said auger pipe and being connected with said feeding pan;
   at least one notch formed in a feed aperture of said auger pipe;
   interengagement means adapted for interengaging said auger pipe with said poultry feeding apparatus to prevent rotational swinging of said apparatus relative to said auger pipe, wherein said interengagement mean is located within said feeder tube at the end connectable with said auger pipe and has a feed aperture with at least one projection formed thereat for interengaging said at least one notch, with said feed apertures of said auger pipe and said interengagement means being substantially in alignment.

10. The poultry feeding apparatus according to claim 9, wherein said interengagement means is substantially complementarily shaped to a portion of said auger pipe incorporating said feed aperture.

11. The poultry feeding apparatus according to claim 9, wherein said at least one projection formed in said interengagement means is a lug formed at the edge of said feed aperture of said interengagement means.

12. The poultry feeding apparatus according to claim 9, wherein said interengagement means is integrally formed in said one end of said feeder tube connectable with said auger pipe.

13. The poultry feeding apparatus according to claim 9, wherein said interengagement means is an insert member engaged with said one end of said feeder tube connectable with said auger pipe.

14. The poultry feeding apparatus according to claim 13, wherein said insert member is made of metal and has a part cylindrical form.

15. The poultry feeding apparatus according to claim 14, wherein said one end of said feeder tube connectable with said auger pipe is adapted to snappingly engage said insert member therein.

16. The poultry feeding apparatus according to claim 13, wherein said insert member comprises two projections formed at opposite ends of said feed aperture of said insert member and said auger pipe comprises two notches formed at opposite ends of said feed aperture of said auger pipe for interengagement with a respective one of said two projections.

17. A poultry feeding system having an auger pipe and a number of poultry feeding apparatuses, each of said poultry feeding apparatuses comprising:
   a feeding pan;
   a feeder tube having one end connected with said auger pipe and being connected with said feeding pan;
   at least one projection formed at a feed aperture of said auger pipe;
   interengagement means being substantially complementarily shaped to said auger pipe and being adapted for interengaging said auger pipe with said poultry feeding apparatus to prevent rotational swinging of said apparatus relative to said auger pipe, wherein said interengagement means is located within said feeder tube at the end connected with said auger pipe and has a feed aperture with at least one notch formed therein for interengaging said at least one projection, with said feed apertures of said auger pipe and said interengagement means being substantially in alignment.

18. The poultry feeding system according to claim 17, wherein said interengagement means is integrally formed in said one end of said feeder tube connectable with said auger pipe.

19. The poultry feeding system according to claim 17, wherein said interengagement means is a metal insert member having a part cylindrical form and being engaged with said one end of said feeder tube connectable with said auger pipe.

20. The poultry feeding system according to claim 17, wherein said insert member comprises two notches at opposite ends of said feed aperture of said insert member and said auger pipe comprises two projections formed at opposite ends of said feed aperture of said auger pipe for interengagement with a respective one of said two notches.

21. A poultry feeding system having an auger pipe and a number of poultry feeding apparatuses, each of said poultry feeding apparatuses comprising:

a feeding pan;

a feeder tube having one end connectable with said auger pipe and being connected with said feeding pan;

at least ore notch formed in a feed aperture of said auger pipe;

interengagement means adapted for interengaging said auger pipe with said poultry feeding apparatus to prevent rotational swinging of said apparatus relative to said auger pipe, wherein said interengagement means is located within said feeder tube at the end connectable with said auger pipe and has a feed aperture with at least one projection formed thereat for interengaging said at least one notch, with said feed apertures of said auger pipe and said interengagement means being substantially in alignment.

22. The poultry feeding system according to claim 21, wherein said interengagement means is integrally formed in said one end of said feeder tube connectable with said auger pipe.

23. The poultry feeding system according to claim 21, wherein said interengagement means is a metal insert member having a part cylindrical form and being engaged with said one end of said feeder tube connectable with said auger pipe.

24. The poultry feeding system according to claim 21, wherein said insert member comprises two projections formed at opposite ends of said feed aperture of said insert member and said auger pipe comprises two notches formed at opposite ends of said feed aperture of said auger pipe for interengagement with a respective one of said two projections.

* * * * *